(12) United States Patent
Piper et al.

(10) Patent No.: US 6,786,001 B1
(45) Date of Patent: Sep. 7, 2004

(54) INSECT TRAP

(76) Inventors: Anthony George Standfast Piper, 3 Highfield Road, London W3 0AJ (GB); Roderick Nigel Jones, 121 Goldhawk Road, London W12 8EN (GB)

( * ) Notice: Subject to any disclaimer, the term of this patent is extended or adjusted under 35 U.S.C. 154(b) by 0 days.

(21) Appl. No.: 10/089,037

(22) PCT Filed: Sep. 22, 2000

(86) PCT No.: PCT/GB00/03639
§ 371 (c)(1),
(2), (4) Date: Jul. 24, 2002

(87) PCT Pub. No.: WO01/22812
PCT Pub. Date: Apr. 5, 2001

(30) Foreign Application Priority Data

Sep. 25, 1999  (GB) .............................................. 9922641

(51) Int. Cl.[7] .............................................. A01M 1/04
(52) U.S. Cl. ...................................................... 43/113
(58) Field of Search .................................. 43/113, 112

(56) References Cited

U.S. PATENT DOCUMENTS

| | | | | |
|---|---|---|---|---|
| 267,375 A | * | 11/1882 | Spears | 43/113 |
| 473,920 A | * | 5/1892 | Edwards | 43/113 |
| 836,052 A | * | 11/1906 | Pool | 43/113 |
| 869,556 A | * | 10/1907 | Haas | 43/113 |
| 1,437,251 A | * | 11/1922 | Kesling | 43/113 |
| 1,488,178 A | * | 3/1924 | Thomas et al. | 43/113 |
| 1,566,619 A | * | 12/1925 | Schlossareck | 43/122 |
| 1,833,699 A | * | 11/1931 | Wolf | 43/113 |
| 3,796,001 A | * | 3/1974 | Jackson | 43/113 |
| 3,820,273 A | | 6/1974 | Novak | |
| 4,212,129 A | * | 7/1980 | Shumate | 43/113 |
| 4,332,100 A | | 6/1982 | Schneider | |
| 4,486,974 A | * | 12/1984 | Yavnieli | 43/112 |
| 4,839,984 A | | 6/1989 | Saunders et al. | |
| 4,856,226 A | * | 8/1989 | Taylor | 43/113 |
| 4,869,015 A | | 9/1989 | Murakami et al. | |
| 4,907,365 A | | 3/1990 | Conigliaro, Jr. | |
| 4,962,611 A | | 10/1990 | Millard | |
| 5,081,788 A | | 1/1992 | Dowd et al. | |
| 5,142,815 A | * | 9/1992 | Birdsong | 43/113 |
| RE34,402 E | * | 10/1993 | Williams | 43/113 |
| 5,255,468 A | * | 10/1993 | Cheshire, Jr. | 43/113 |
| 5,323,556 A | * | 6/1994 | Carle | 43/139 |
| 5,513,465 A | * | 5/1996 | Demarest et al. | 43/113 |
| 5,608,987 A | | 3/1997 | Meyer | |
| 6,134,826 A | * | 10/2000 | Mah | 43/112 |

FOREIGN PATENT DOCUMENTS

| | | |
|---|---|---|
| DE | 198 35 059 A1 | 2/2000 |
| EP | 0947134 | 10/1999 |
| FR | 2 539 954 | 8/1984 |
| GB | 2 282 042 | 3/1995 |
| WO | WO 97/20460 | 6/1997 |

OTHER PUBLICATIONS

COpy of Search Report issued in corresponding United Kingdom Patent Application No. GB 9922641.7, dated Feb. 14, 2000, 2 pages.

* cited by examiner

Primary Examiner—Charles T. Jordan
Assistant Examiner—Jordan Lofdahl
(74) Attorney, Agent, or Firm—Baker & Daniels

(57) ABSTRACT

An insect trap comprises an outer casing (3) having an opening, a light source (2), and a cover (1c) substantially closing the opening of the casing. The cover (1c) tapers from a first cross-section which matches that of the opening of the outer casing to a second cross-section which defines an insect entry port (4) leading into a chamber (5). The cover (1c) is made of a material that is substantially transparent to light having the frequency of the light source (2), and the light source is positioned so as to be visible from the open end of the outer casing (3) through the cover.

31 Claims, 3 Drawing Sheets

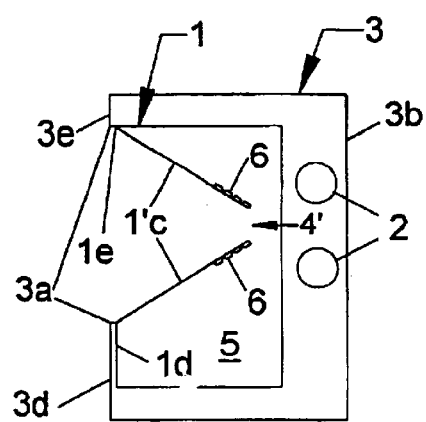
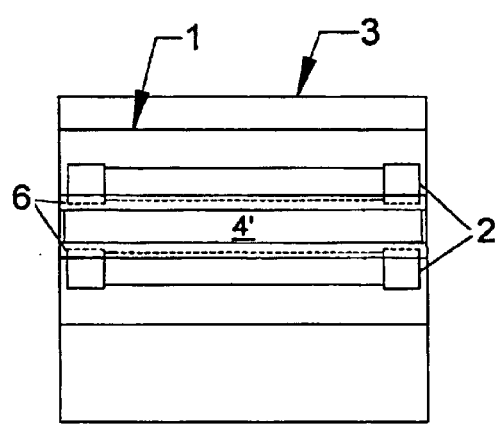
Fig. 7a
Fig. 7b
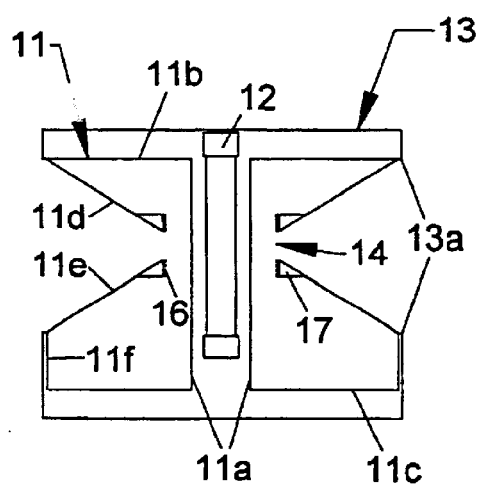
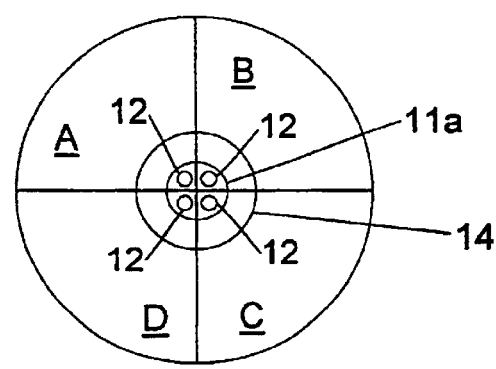
Fig. 8
Fig. 9

INSECT TRAP

The present invention relates to a trap for insects which are attracted by light.

Insects are a nuisance, and in many cases a health hazard. Various means are employed to kill them. A common method is to use ultraviolet light to attract insects to a high voltage electrocution grid, or to an adhesive trapping board. Electrocution grids and their associated electrical components involve a high capital cost, while adhesive boards have a limited effective life, are expensive and need to be replaced frequently.

The aim of the invention is to provide a trap for insects which is economic to produce and maintain, and which does not suffer from the disadvantages of known traps.

The present invention provides an insect trap comprising an outer casing, an inner casing and a source of electromagnetic radiation, the outer casing having an opening, the inner casing being mounted within the outer casing and having a back wall and a cover, the cover tapering from a first cross-section which matches hat of the opening of the outer casing to a second cross-section which defines an insect entry port leading into a chamber defined, at least partially, by the internal surfaces of the back wall and the cover, at least the back wall and the cover being made of a material that is substantially transparent to electromagnetic radiation having the frequency of the source, and the source being positioned within the outer casing outside the chamber so as to be visible from the open end of the outer casing through the cover.

In a preferred embodiment, the inner casing further comprises side wall means connected to the cover at its first cross-section and to the back wall, the chamber being defined by the internal surfaces of the back wall, the cover and the side wall means. In this case, the outer casing may have a closed end opposite to its opening, and the inner casing may have a cross-section which complements that of the outer casing in such a manner that the inner casing is a close fit within the outer casing at least at the opening of the outer casing, the cover tapering towards the back wall of the inner casing, and the back wall of the inner casing being positioned adjacent to the closed end of the outer casing. Advantageously, the source is positioned between the back wall and the closed end of the outer casing.

Preferably, the cover is integrally formed with the back wall and the side wall means.

The source may be a light source, preferably an ultraviolet light source.

The outer casing conveniently has a generally square cross-section, and the cover takes the form of a square-based pyramid. In this case, the entry port is substantially square.

Alternatively, the outer casing has a substantially rectangular cross-section, and the cover is frustoconical, or the outer casing has an irregular shape, and the cover is frustoconical. In any of these cases, the entry port may be substantially rectangular, circular or elliptical.

In another alternative, the entry port may take the form of an elongate opening defined by angled portions of the cover and the internal side wall means.

Advantageously, the outer casing is made of a material that is substantially opaque to electromagnetic radiation having the frequency of the source, and the cover and the base of the inner casing are made of a plastics material (preferably an acrylic plastics material) transparent to electromagnetic radiation having the frequency of the source.

In another arrangement, the outer casing is generally cylindrical in configuration, having an annular opening in its cylindrical side wall, the annular opening defining the opening of the outer casing, the inner casing having a tubular compartment, an annular top wall and an annular bottom wall, and the cover being constituted by a pair of frustoconical cover plates which converge towards one another to define an annular entry port which surrounds the tubular compartment, and wherein the source is positioned within the tubular compartment.

In this case, the trap may be of modular construction, having a plurality of trap portions. Preferably, the trap has four portions, each having the cross-section of a quadrant of a circle.

In a preferred embodiment, the insect trap further comprises means for deterring insects from leaving the chamber via the entry port, the deterrent means being positioned within the inner casing adjacent to the entry port. Preferably, the deterrent means is constituted by a plurality of substantially parallel electrodes, adjacent electrodes being of opposite polarity, and the electrodes being spaced apart in such a manner that insects of species commonly regarded as pests can simultaneously touch at least two electrodes of opposite polarity.

Advantageously, the electrodes are spaced apart by a distance lying within the range of from 0.5 mm to 2.5 mm, and preferably the electrode spacing is substantially 1 mm. Also, the width of each of the electrodes may lie within the range of from 0.5 mm to 2.5 mm, and preferably the width of each electrode is substantially 1 mm.

Conveniently, the electrodes are provided with means for connection to an alternating current mains supply.

The trap may further comprise current limiting means for limiting the current supplied to the electrodes. Preferably, the current limiting means is such that insects that contact the deterrent means are stunned or disoriented.

Several forms of insect trap, each of which is constructed in accordance with the invention, will now be described in greater detail, by way of example, with reference to the drawings, in which:

FIG. 6b is a schematic front elevation of the insect trap of FIG. 6a;

FIG. 7a is a schematic side elevation of the fourth form of insect trap;

FIG. 7b is a schematic front elevation of the insect trap of FIG. 7a;

FIG. 8 is a schematic side elevation of the fifth form of insect trap; and

FIG. 9 is a plan view of a modified version of the insect trap of FIG. 8.

Figure 1:
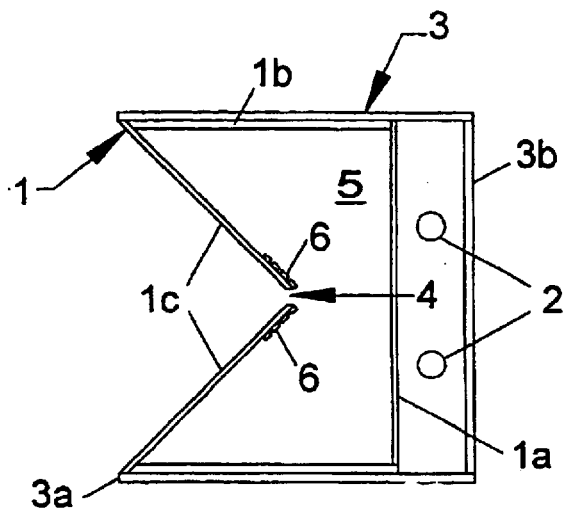
FIG. 1 is a schematic sectional side view of the first form of insect trap.

Referring to the drawings, FIG. 1 shows the first form of insect trap which has an inner casing 1 and an ultraviolet light source 2 mounted within an outer casing 3. The ultraviolet light source 2 is constituted by a pair of ultraviolet fluorescent tubes. The tubes are mains powered, and are provided with conventional connection means (not shown) for electrical connection to the mains. The outer casing 3 is generally cubical having an open end 3a and a closed end 3b at the opposite end. The inner casing 1 is made of a material, such as an acrylic, which is transparent to ultraviolet light, and the outer casing 3 is made of a material such as ABS which is opaque to ultraviolet light. The acrylic material is not only transparent to ultraviolet light, but is also resistant to ultraviolet, that is to say it is resistant to degradation by ultraviolet light. The inner casing 1 is generally cuboidal having a back wall 1a, side walls 1b and a cover 1c generally in the form of a square-based pyramid with an open base. The narrow end of the pyramid-shaped cover 1c is open to define an entry port 4. The internal surfaces of the back wall 1a, the side walls 1b and the cover 1c define a chamber 5 which constitutes a receptacle for holding trapped insects. The ultraviolet source 2 is positioned between the back wall 1a of the inner casing and the closed end 3b of the outer casing 3

In use, the ultraviolet light source 2 attracts insects to the trap and into the chamber 5 via the narrow entry port 4. Once in the chamber 5, insects find it difficult to escape via the narrow port 4. Although trapped insects will eventually die inside the chamber 5, means are preferably provided to deter trapped insects from happening upon the port 4 and escaping. Preferably, the deterrent means is an electrified stunning grid 6 positioned within the chamber 5 adjacent to the port 4. Means may also be provided to accelerate the dying process. For example, a renewable desiccant can be provided within the chamber 5, the desiccant being effective to accelerate dehydration of trapped insects, thereby accelerating their death.

Figure 3:
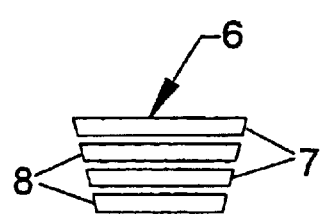
FIG. 3 is a schematic representation, on an enlarged scale, of a stunning grid which can be incorporated within the trap of FIG. 1.

The grid 6 is constituted by four grid sections, each of which is attached to one of the four tapering walls defining the cover 1c. Each of the grid sections (one of which is shown in FIG. 3) is constituted by a series of parallel, adjacent electrodes 7 and 8 of opposite polarities. The electrodes 7 are electrically connected by means of a first base plate (not shown), and the electrodes 8 are electrically connected by means of a second base plate (not shown). The electrodes 7 and 8 are connectable to the mains by means of contacts (not shown). The mains voltage may be any normal mains voltage such as 100 volts or 240 volts, alternating at normal frequencies such as 50 Hz to 60 Hz. Preferably, the current applied to the grid 6 is limited by means of a suitable current-limiting device (not shown) which limits the current to an appropriate value (for example 5 mA). The electrodes 7 and 8 are sized and spaced so that insects of species commonly regarded as pests will simultaneously touch at least a pair of electrodes 7 and 8 of opposite polarity, on coming into contact with the grid 6. Typically, the electrodes 7 and 8 have a width of 1 mm, and a spacing of 1 mm.

The electrodes 7 and 8 are made of a suitable metal, such as stainless steel and may be supported by a non-conducting substrate made of, for example, fibreglass. Alternatively, the electrodes 7 and 8 could be deposited onto the cover 1c, for example by electrodeposition. Being made of stainless steel the electrodes 7 and 8 are resistant to oxidation, and to degradation from the effects of humidity and/or chemicals from the trapped insects.

This simple grid 6 has a distressing affect on insects, which find contact with it unsustainable. They either fly or leap off in a state of disorganisation or fall to the floor of the trap, temporarily stunned. Contact with the grid 6 causes damage, and repeated contact will have a cumulative effect, leading to accelerated death. As the grid 6 is sited round the port 4, random escape is prevented by deterring access to the narrow mouth of the port.

Figure 2:
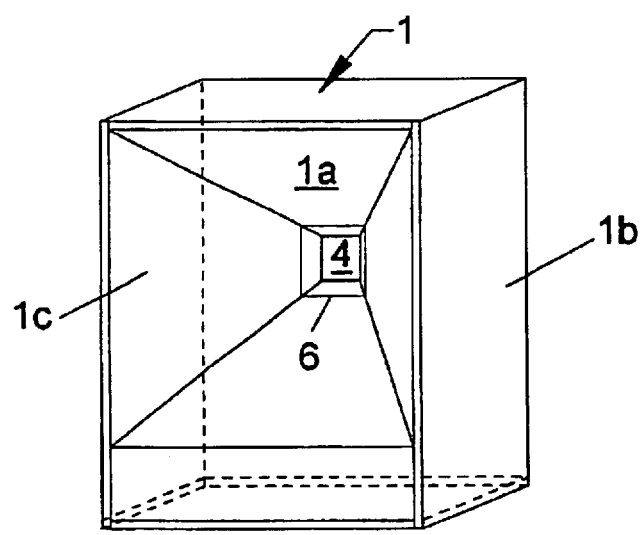
FIG. 2 is a perspective view of a trapping chamber forming part of the trap of FIG. 1.
Figure 4:
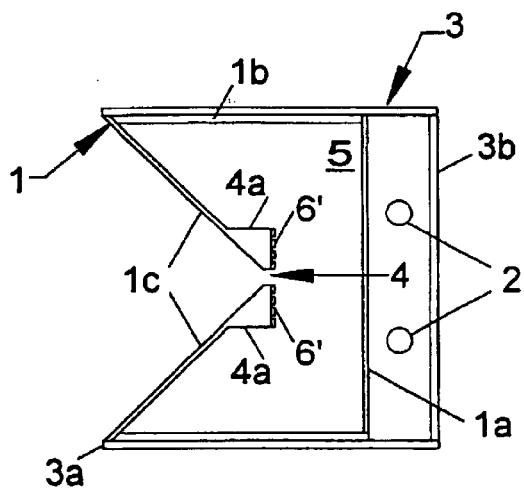
FIG. 4 is a schematic sectional side view of the second form of insect trap.
Figure 5:
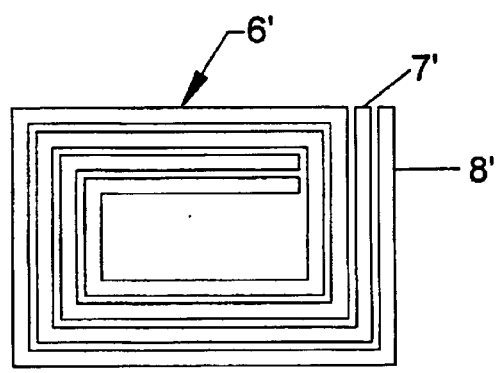
FIG. 5 is a schematic representation, on an enlarged scale, of a stunning grid which can be incorporated within the trap of FIG. 4.

FIG. 4 shows the second form of insect trap. This trap is a modified version of the trap of FIGS. 1 to 3, so like reference numerals will be used for like parts, and only the modifications will be described in detail. This trap differs from that of FIGS. 1 to 3 in that the port is fined by generally triangular-shape flanges 4a formed at the inner ends of the four tapering walls defining the cover 1c, and by a modified form of grid 6' (see FIG. 5). The grid 6 has a pair of electrodes 7' and 8' opposite polarities, each of the electrodes being in the form of a "square spiral". The grid 6' is in one plane rather than in the planes of each of the four tapering walls defining the cover 1c. The grid 6' is fixed to the flanges 4a. so as to surround the port 4. The electrodes 7' and 8' are connected to the mains by means of contacts (not shown).

The second form of insect trap operates in the same way as the first form of insect trap.

Figure 6A:
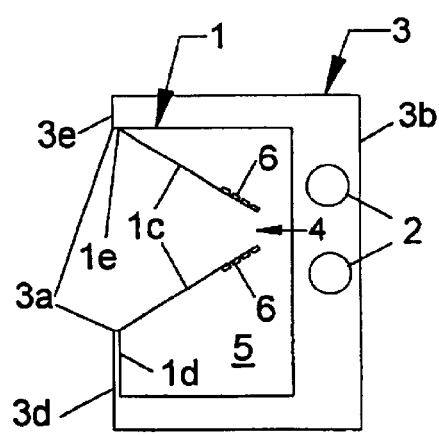
FIG. 6a is a schematic side elevation of the third form of insect trap.
Figure 6B:
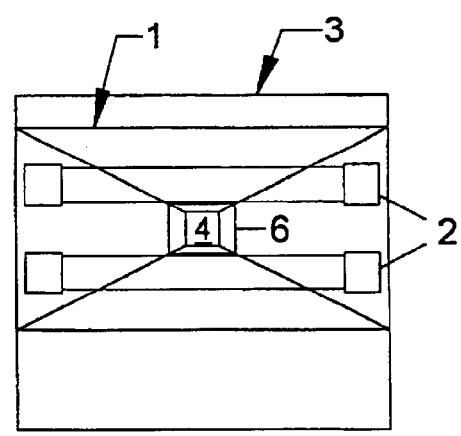

FIGS. 6a and 6b show the third form of insect trap. This trap is also a modified version of the trap of FIGS. 1 to 3, so like reference numerals will be used for like parts, and only the modifications will be described in detail. This trap differs from that of FIGS. 1 to 3 in that the out and the inner casing 1 are asymmetrical, the outer casing having a lower front wall 3d that has a greater height than its upper front wall 3e. Similarly, the inner casing 1 has a lower front wall 1d, which contrasts with the upper front end 1e of the inner casing which is pointed. The outer casing lower front wall 3d covers the inner casing lower wall 1d. One advantage of this arrangement is that the lower portion of the chamber 5 defined by the inner casing 1 is larger than that of the trap of FIGS. 1 to 3, and so can hold a larger number of dead insects. The grid 6 of this trap is identical to that of the trap of FIGS. 1 to 3.

The fourth form of trap, shown in FIGS. 7a and 7b, is identical to that of FIGS. 6a and 6b except that the inner casing 1 is not frustoconical, having a cover 1'c defined by a pair of walls which are angled respectively from the edge of the upper side wall 1b and from the upper edge of the lower front wall 1d to an elongate entry port 4' defined by the horizontal ends of the angled walls of the cover and the side walls of the outer casing 1. In this case, there are two grids 6 fixed to the free ends of the angled wall adjacent to the entry port 4'. Each grid 6 is constituted by a modified elongate version of the grid section shown in FIG. 3. Two further grids (not shown) are fixed to the side walls 1b immediately inside the chamber 5 and adjacent to the entry port 4'.

The trap of FIG. 8 has an inner casing 11 and an ultraviolet source 12 mounted within an outer casing 13. The outer casing 13 is generally cylindrical, having an annular opening 13a which extends over the major portion of its cylindrical side wall. The inner casing 11 is of generally cylindrical configuration, and includes a generally tubular annular compartment 11a, a generally annular top wall 11b, a generally annular bottom wall 11c, and a pair of cover plates 11d and 11e, each of frustoconical configuration. The cover plate 11d is angled downwardly and inwardly from the top wall 11b, and the cover plate 11e is angled upwardly and inwardly from a lower front wall 11f. The free ends of the two cover plates 11d and 11e thus form an annular entry port 14 which surrounds the compartment 11a. The ultraviolet light source 12, which is constituted by a single tube, is positioned within the tubular compartment 11a. A respective grid 16 is positioned on triangular-shaped flanges 14a formed at the inner ends of the two conical cover plates 11d and 11e, and adjacent to the entry port 14. Each grid 16 is constituted by a plurality (typically six) of parallel electrodes, each of which is of annular configuration. As with the grid 6 of FIGS. 1 to 3, adjacent electrodes are of opposite polarity, and the electrodes of each polarity are connected to one another and to a respective mains terminal.

As with the earlier embodiments, the inner casing 11 is made of an acrylic which is transparent to ultraviolet light, and the outer casing 13 is made of ABS which is opaque to ultraviolet light.

This trap operates in the same manner, and has similar advantages to, the first four forms of trap.

This trap can be of modular construction, as shown in FIG. 9, which shows the trap formed from four quadrants A, B, C and D, and with four ultraviolet light sources 12, each of which is positioned in a respective quadrant-shaped channel at the "apex" of the associated quadrant. The trap could be used in this configuration, or it could consist of one, two or three of the quadrants. For example, where a trap is to be positioned in the corner of a room it could have only one trapping chamber quadrant.

The insect traps described above have considerable advantages over known traps. They are cheaper to manufacture and more effective than know electrocuting insect traps, and cheaper to run than traps utilizing replaceable adhesive boards. They are also more effective than known traps, in that they retain all the insects they attract—electrocuting insect traps only work with larger insects, and adhesive board traps only trap a proportion of the insects attracted. Unlike electrocute insect traps, the traps described above do not eject fragments of trapped and killed insects, and so are suitable for use in the proximity of food. Another advantage of these traps is that the ultraviolet tube(s) are enclosed, so that the need for expensive shatter proofing (which is required with some known traps when used in the vicinity of food) is avoided It will be apparent that modifications could be made to the traps described above. Thus, the ultraviolet light sources 2 or 12 could be replaced by different light sources, though ultraviolet light is preferred as it is more attractive to insects. In this case, the inner casing 1 or 11 would be made of a material transparent to light of the appropriate frequency, and the outer casing 3 or 13 would be made of a material opaque to light of that frequency. The cover 1c could be of any frustoconical shape, and could be regular, irregular or asymmetric in cross-section. It would also be possible to position the light source 2 or 12 outside the casing 3 or 13, and to provide means for conducting light to the back wall 1a or to the compartment 11a so as to shine through that member and through the cover 1c or the cover plates 11d and 11e. It would, of course, be possible to use a single ultraviolet tube, or two or more such tubes, as the ultraviolet source.

The grid 6, 6' or 16 could also be electrified with any voltage at which current may pass through an insect at a sufficient level to disorientate, damage or otherwise discourage it from remaining on the grid. Similarly, frequencies other than those normally used for a mains supply could be used. It would also be possible to use alternating currents having waveforms other than sinusoidal. Direct current or pulsed direct current could also be used, though steady direct current may be less effective, in that it may cause insects to stick to the grid 6, 6' or 16, rather than be jolted off or leap/fly away. This could clog the grid 6, 6' or 16, and lead to the possibility of a carbonised link creating a short circuit. Direct current would, therefore, lead to the need for the grid 6, 6' or 16 to be cleaned frequently.

It would also be possible to provide that portion of the outer casing 3 or 13 adjacent to the light source(s) 2 or 12 with ventilation holes for cooling the light source(s) and the body of the trap. Such ventilation holes would be provided with baffles to prevent the light source(s) 2 or 12 from being seen from outside the trap through the ventilation holes. The inner casing 1 or 11 and the outer casing 3 or 13 could be of modular construction, thereby permitting traps of different sizes to be made from a small number of basic components. A removable tray for facilitating the removal of dead insects could be provided. Alternatively, a door or a removable portion of the inner casing 1 or 11 may facilitate this. The easy removability of the inner casing 1 or 11 from the outer casing 3 or 13 facilitates access to the interior of the trap for cleaning purposes. Another possibility would be to make the inner casing 1 or 11 from a disposable material such as paper which is at least partially transparent to light having the frequency of the light source.

In a further embodiment (not shown), the inner casing 1 could be constituted simply by the cover 1c and the back wall 1a. In this case, the cover would be fixed within the open end 3a of the outer casing 3, and the chamber 5 would be defined by the internal surfaces of the cover 1c, the back wall 1a and the side walls of the outer casing 3.

Also, the electrodes 7 and 8 could be made of a non-metallic conductor such as carbon. Finally, the grid 6, 6' or 16 could be replaced, or supplemented, by the use of a renewable desiccant or other means for accelerating the death of trapped insects such as heat, infrared radiation or an appropriate electromagnetic field for affecting the nervous system of the insects. If a heat source is used, care must be taken that it is not too intense as to raise the temperature of the trap itself to an undesirable extent.

What is claimed is:

1. An insect trap comprising an outer casing, an inner casing and a source of electromagnetic radiation, the outer casing having an opening, the inner casing being mounted within the outer casing and having a back wall and a cover, the cover tapering from a first cross-section which matches that of the opening of the outer casing to a second cross-section which defines an insect entry port leading into a an insect trapping chamber defined, at least partially, by the internal surfaces of the back wall and the cover, at least the back wall and the cover being made of a material that is substantially transparent to electromagnetic radiation having the frequency of the source, and the source being positioned within the outer casing outside the chamber so as to be visible from the open end of the outer casing through the cover.

2. An insect trap as claimed in claim 1, wherein the inner casing further comprises side wall means connected to the cover at its first cross-section and to the back wall, the chamber being defined by the internal surfaces of the back wall, the cover and the side wall means.

3. An insect trap as claimed in claim 2, wherein the outer casing has a closed end opposite to its opening, and the inner casing has a cross-section which complements that of the outer casing in such a manner that the inner casing is a close fit within the outer casing at least at the opening of the outer casing, the cover tapering towards the back wall of the inner casing, and the back wall of the inner casing being positioned adjacent to the closed end of the outer casing.

4. An insect trap as claimed in claim 3, wherein the source is positioned between the back wall of the inner casing and the closed end of the outer casing.

5. An insect trap as claimed in claim 3, wherein the cover is integrally formed with the back wall and the side wall means.

6. An insect trap as claimed in claim 1, wherein the source is a light source.

7. An insect trap as claimed in claim 1, wherein the source is an ultraviolet light source.

8. An insect trap as claimed in claim 1, wherein the outer casing has a generally square cross-section, and the cover takes the form of a square-based pyramid.

9. An insect trap as claimed in claim 8, wherein the entry port is substantially square.

10. An insect trap as claimed in claim 1, wherein the outer casing has a substantially rectangular cross-section, and the cover is frustoconical.

11. An insect trap as claimed in claim 1, wherein the outer casing has an irregular shape, and the cover is frustoconical.

12. An insect trap as claimed in claim 1, wherein the entry port is substantially rectangular, circular or elliptical.

13. An insect trap as claimed in claim 1, wherein the entry port takes the form of an elongate opening defined by angled portions of the cover and internal side wall means.

14. An insect trap as claimed in claim 1, wherein the outer casing is made of a material that is substantially opaque to electromagnetic radiation having the frequency of the source.

15. An insect trap as claimed in claim 1, wherein the cover and the back wall of the inner casing are made of a plastics material transparent to electromagnetic radiation having the frequency of the source.

16. An insect trap as claimed in claim 1, wherein the cover and the back wall of the inner casing are made of an acrylic plastics material transparent to electromagnetic radiation having the frequency of the source.

17. An insect trap as claimed in claim 1, wherein the outer casing is generally cylindrical in configuration, having an annular opening in its cylindrical side wall, the annular opening defining the opening of the outer casing, the inner casing having a tubular compartment, an annular top wall and an annular bottom wall, and the cover being constituted by a pair of frustoconical cover plates which converge towards one another to define an annular entry port which surrounds the tubular compartment, and wherein the source is positioned within the tubular compartment.

18. An insect trap as claimed in claim 17, wherein the trap is of modular construction, having a plurality of trap portions.

19. An insect trap as claimed in claim 18, wherein the trap has four portions, each having the cross-section of a quadrant of a circle.

20. An insect trap as claimed in claim 1, further comprising means for deterring insects from leaving the chamber via the entry port, the deterrent means being positioned within the inner casing adjacent to the entry port.

21. An insect trap as claimed in claim 20, wherein the deterrent means is constituted by a plurality of substantially parallel electrodes, adjacent electrodes being of opposite polarity, and the electrodes being spaced apart in such a manner that insects of species commonly regarded as pests can simultaneously touch at least two electrodes of opposite polarity, the electrodes being positioned within the enclosure, or inner surfaces of the tapering wall adjacent to the insect entry opening.

22. An insect trap as claimed in claim 21, wherein the electrodes are spaced apart by a distance lying within the range of from 0.5 mm to 2.5 mm.

23. An insect trap as claimed in claim 22, wherein the electrode spacing is substantially 1 mm.

24. An insect trap as claimed in claim 21, wherein the width of each of the electrodes lies within the range of from 0.5 mm to 2.5 mm.

25. An insect trap as claimed in claim 24, wherein the width of each of the electrodes is substantially 1 mm.

26. An insect trap as claimed in claim 21, wherein the electrodes are provided with means for connection to an alternating current mains supply.

27. An insect trap as claimed in claim 26, further comprising current limiting means for limiting the current supplied to the electrodes.

28. An insect trap as claimed in claim 27, wherein the current limiting means is such that insects that contact the deterrent means are stunned or disorientated.

29. An insect trap as claimed in claim 20, wherein the enclosure is defined by an outer casing and an inner casing, the inner casing being mounted within the outer casing and having a back wall opposite the tapering wall, the cover tapering from a first cross-section which matches that of the opening of the outer casing to a second cross-section to define the insect entry port, at least the back wall and the cover of the inner casing being made of a material that is substantially transparent to electromagnetic radiation having the frequency of the source, and the source being positioned within the outer casing, and outside the inner casing, so as to be visible from the open end of the outer casing through the cover.

30. An insect trap as claimed in claim 29, wherein the source is an ultraviolet light source.

31. An insect trap comprising an outer casing, an inner casing and a source of electromagnetic radiation, the outer casing having an opening, the inner casing being mounted within the outer casing and having a back wall and a cover, the cover tapering from a first cross-section which matches that of the opening of the outer casing to a second cross-section which defines an insect entry port leading into a chamber defined, at least partially, by the internal surfaces of the back wall and the cover, the back wall being substantially planar and positioned to face the insect entry port, at least the back wall and the cover being made of a material that is substantially transparent to electromagnetic radiation having the frequency of the source, and the source being positioned within the outer casing outside the chamber so as to be visible from the open end of the outer casing through the cover.

* * * * *

UNITED STATES PATENT AND TRADEMARK OFFICE
CERTIFICATE OF CORRECTION

PATENT NO. : 6,786,001 B1
DATED : September 7, 2004
INVENTOR(S) : Anthony George Standfast Piper et al.

It is certified that error appears in the above-identified patent and that said Letters Patent is hereby corrected as shown below:

Column 6,
Line 38, delete "a"

Signed and Sealed this

Twenty-fourth Day of May, 2005

JON W. DUDAS
*Director of the United States Patent and Trademark Office*